US007847861B2

(12) United States Patent
Zhai et al.

(10) Patent No.: US 7,847,861 B2
(45) Date of Patent: Dec. 7, 2010

(54) METHOD AND APPARATUS FOR ENCODING VIDEO PICTURES, AND METHOD AND APPARATUS FOR DECODING VIDEO PICTURES

(75) Inventors: Jiefu Zhai, Beijing (CN); Ying Chen, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 1288 days.

(21) Appl. No.: 11/392,427

(22) Filed: Mar. 29, 2006

(65) Prior Publication Data

US 2006/0262216 A1 Nov. 23, 2006

(30) Foreign Application Priority Data

Apr. 8, 2005 (EP) .................................. 05300261

(51) Int. Cl.
*H04N 7/12* (2006.01)
(52) U.S. Cl. .............................. 348/394.1; 375/240.01; 375/240.12; 375/240.16
(58) Field of Classification Search ............ 375/240.01, 375/240.12, 240.123, 240.16; 348/394.1, 348/398.1, 416.1, 411.1
See application file for complete search history.

(56) References Cited

U.S. PATENT DOCUMENTS

| 6,519,285 | B2 * | 2/2003 | Yamaguchi et al. .... | 375/240.12 |
| 7,627,034 | B2 * | 12/2009 | Park et al. .............. | 375/240.08 |
| 2006/0104354 | A1 * | 5/2006 | Han et al. .............. | 375/240.03 |

OTHER PUBLICATIONS

Search Report, Sep. 26, 2005.

Julien Reichel, Heiko Schwarz, Mathias Wien: "Joint Scalable Video Model JSVM O" Joint Video Team (JVT) of ISO/IEC MPEG & ITU-T VCEG, 'Online! Feb. 5, 2005, XP002345849 Retrieved from the Internet URL: http://ftp3.itu.int/av-arch/jvt-site/2 005-01 HongKong/JVT-NO21.zip>'retrieved on Sep. 20, 2005! pp. 11-14.

JVT Group: "Description of Core Experiments in SVC. CE7 Enhancement Layer Intra Prediction" Joint Video Team (JVT) of ISO/IEC MPEG & ITU-T VCEG, 'Online! Feb. 23, 2005 XP002345850 Retrieved from the Internet: URL:http//ftp.3itu.int/av-archfjvt-site/2 005-01 HongKong/JVT-NO25d0.zip>retrieved on Sep. 20, 2005! pp. 57-58.

(Continued)

*Primary Examiner*—David C Payne
*Assistant Examiner*—Rahel Guarino
(74) *Attorney, Agent, or Firm*—Robert D. Shedd; Paul P. Kiel; Guy H. Eriksen

(57) ABSTRACT

The H.264 standard has introduced a new coding method for intra-coded pictures, which is named "intra prediction". The basic idea of intra prediction is to predict a block using reconstructed neighbour pixels. Thus, only the residual information needs to be encoded. Scalable video coding adds some scalable extension to H.264, in terms of spatial, temporal and SNR scalability. An improved encoding method for scalable video comprises generating from a video picture a first and a second picture with higher resolution than the first picture, wherein each macroblock in the first picture has a plurality of corresponding macroblocks in the second picture, intra-coding the first picture on macroblock level, wherein for each macroblock a prediction direction is determined, generating a first residual picture, intra-coding the second picture on macroblock level, wherein for each macroblock the prediction direction of the corresponding macroblock of the first picture is reused, and generating a second residual picture.

5 Claims, 3 Drawing Sheets

OTHER PUBLICATIONS

Peng,Yin, Jill Boyce, Purvin Pandit: "Technical description of the Thomson proposal for SVC CE7—spatial intra prediction on enhancement layer residue" Joint Video Team (JVT) of ISO/IEC MPEG & ITU-T VCEG, Online! Apr. 14, 2005 XP002345851 Retrieved from the Internet: URL:http://ftp3.itu.int/av-arch/jvt-site/2 005-04 Busan/JVT-053. doc> Retrieved on Sep. 20, 2005 p. 1-p. 9.

Liahuan Xiong: "Improving enhancement layer intra prediction" Online! Apr. 14, 2005, XP002345852 Retrieved from the Internet: URL:http://ftp.3.itu,int/av-arch/jvt-site/2 005-04 Busan/JVT-029. doc> retrieved on Sep. 20, 2005 p. 1-p. 5.

\* cited by examiner

METHOD AND APPARATUS FOR ENCODING VIDEO PICTURES, AND METHOD AND APPARATUS FOR DECODING VIDEO PICTURES

This application claims the benefit, under 35 U.S.C. §119 of European Patent Application 05300261.4, filed Apr. 8, 2005.

FIELD OF THE INVENTION

This invention relates to a method and apparatus for encoding video data, and a method and apparatus for decoding video data.

BACKGROUND

The H.264 standard, also known as JVT or MPEG-4 AVC, has introduced several new features that allow achieving considerable coding efficiency improvement compared to older standards such as MPEG-2/4, and H.263. For intra pictures, i.e. pictures that can be decoded without referring to other pictures, it introduced a new coding tool named "intra prediction". The basic idea of intra prediction is to predict a block using reconstructed neighbour pixels. Thus, only the residual information needs to be encoded.

In H.264, two different intra prediction modes are employed: one is intra4×4 mode and the other is intra16×16 mode. For intra4×4 mode, the macroblock is divided into sixteen 4×4 blocks and use the neighbour pixels to predict the block. Nine prediction directions are defined in the intra4×4 mode, as shown in FIG. 1. Intra4×4 mode is often more effective when the macroblock contains a lot of details. Contrarily, intra16×16 mode is more effective when the macroblock is flat and has fewer details. The intra16×16 mode defines only four prediction directions, as shown in FIG. 2.

Scalable video coding (SVC) is an attractive technology. Therefore MPEG prepares to constitute a new standard to address the requirements in application. The new standard will be based on the H.264/AVC technology and add some scalable extension. Spatial, temporal and SNR scalability will be defined in the new standards, and it could be cut down to meet the requirement of special applications. In the following, the current coding tools for intra pictures in scalable video coding will be shortly described.

In the spatial scalable scenario, two different resolutions are encoded. The most common method is to code the two layers separately, without considering the correlation between them. When coding each layer, intra prediction is employed. This approach is straightforward and may not be very efficient. In JSVM, another coding tool named "INTRA_BL" is employed to exploit the correlation between two layers. In INTRA_BL mode, the base layer (having low resolution) is first upsampled using a half pixel interpolation 6-tap filter, which is defined in the H.264/AVC standard. Then the upsampled signal is used to predict the current layer signal, so that only the residual needs to be encoded. In INTRA_BL mode, the side information is very small. Only one flag per macroblock needs to be sent. The residual coding could be the same as in H.264/AVC.

SUMMARY OF THE INVENTION

The object of the present invention is to provide an improved encoding method for intra coded data, i.e. data units such as frames that are encoded without reference to other data units.

The present invention provides an enhancement technique named intra direct, to improve the coding efficiency of e.g. intra pictures in the scenario of spatial scalable video coding. As intra prediction is an efficient tool to improve the coding efficiency of intra pictures, scalable video coding may also utilize intra prediction for intra picture coding. The main idea of intra prediction is to predict samples of a frame from other, previously decoded samples of the same frame, wherein different prediction directions are possible. E.g. a sample can be predicted from a sample to the left or from a sample above. The method according to the invention exploits the correlation of intra prediction direction between the base layer (BL) and the enhancement layer (EL). The present invention introduces a new method called "intra direct" for the EL, which inherits the intra prediction direction from the BL, and thus needs not to encode the intra-prediction mode as side information. The coding efficiency within a scalable video codec can be improved by incorporating the introduced coding tool.

The inventive method for encoding video pictures comprises the steps of generating from an intra coded video picture a first (BL) and a second picture (EL), wherein the second picture (EL) has a higher resolution than the first picture (BL) and each macroblock in the first picture (BL) has a plurality of corresponding macroblocks in the second picture (EL), intra-coding the first picture (BL) on macroblock level, wherein for each predicted macroblock a prediction direction is determined, i.e. a pointer to or from another macroblock from which it can be predicted, generating a first residual picture being the difference between the first picture (BL) and the intra-coded first picture, intra-coding the second picture (EL) on macroblock level, wherein for each macroblock the prediction direction of the corresponding macroblock of the first picture (BL) is reused (and usually needs to be scaled to compensate the different resolutions of the first and the second picture), and generating a second residual picture being the difference between the second picture (EL) and the intra-coded second picture.

An apparatus that utilizes the method comprises means for generating from an intra coded video picture a first (BL) and a second picture (EL), wherein the second picture (EL) has a higher resolution than the first picture (BL) and each macroblock in the first picture (BL) has a plurality of corresponding macroblocks in the second picture (EL), means for intra-coding the first picture (BL) on macroblock level, wherein for each predicted macroblock a prediction direction is determined, means for generating a first residual picture being the difference between the first picture (BL) and the intra-coded first picture, means for intra-coding the second picture (EL) on macroblock level, wherein for each macroblock the prediction direction of the corresponding macroblock of the first picture (BL) is reused (and usually includes a means for scaling to compensate the different resolutions of the first and the second picture), and means for generating a second residual picture being the difference between the second picture (EL) and the intra-coded second picture.

Further, a method for decoding video pictures according to the invention comprises the steps of decoding an encoded first, BL video picture, wherein the encoded first video picture is intra-coded and contains encoded macroblocks, and for each encoded macroblock prediction direction information and residual information, and decoding an encoded second, EL video picture, wherein the encoded second video picture also contains encoded macroblocks, and wherein for decoding an encoded macroblock the prediction direction information from the corresponding encoded macroblock of the encoded first video picture is reused.

An apparatus that utilizes the method comprises respective means for executing the corresponding method steps.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 the prediction directions defined for intra4×4.

DETAILED DESCRIPTION OF THE INVENTION

The present invention concentrates on intra-picture coding in a spatial scalable video coding scenario. Without loss of generality, two-layer spatial scalable coding is considered. Exemplarily, the BL is half the resolution of EL. It could however be different, e.g. quarter resolution.

It is noticed that when the two layers are both intra-coded and use intra-prediction, the intra-prediction direction on the two layers has some correlation. Therefore a coding method for the EL, according to the invention, is able to exploit this kind of redundancy. We will call this new method "INTRA_DIRECT".

In this approach, first the BL is intra-coded using H.264 syntax without any modification. Each macroblock in the BL corresponds to four macroblocks in the EL. The intra prediction directions are directly upsampled, which means the intra prediction direction of the BL is directly given to the co-located blocks in the EL. E.g. when the BL macroblock uses intra4×4 mode, each 4×4 block in the BL corresponds to four 4×4 blocks in the EL, as shown in FIG. 3.

Figure 1:
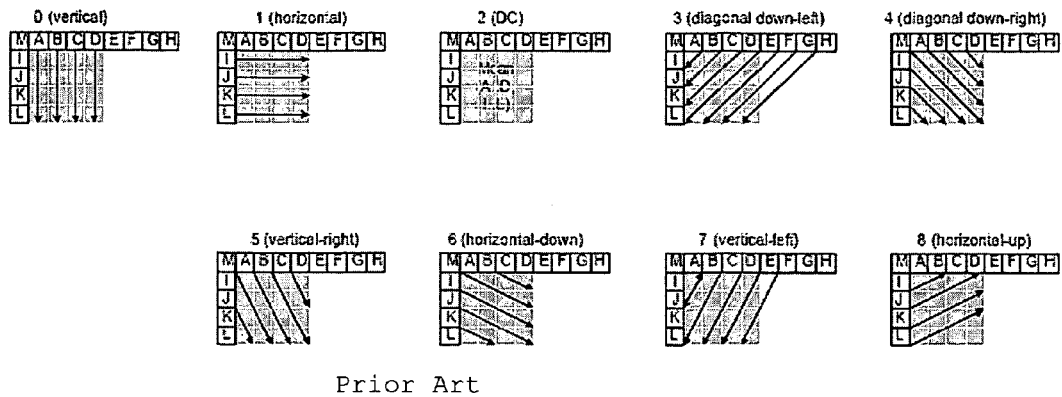
Figure 2:
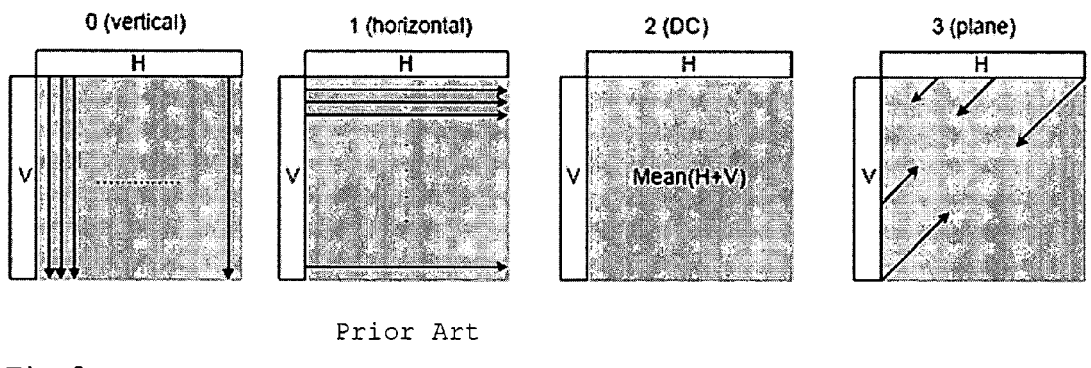
FIG. 2 the prediction directions defined for intra16×16.
Figure 3:
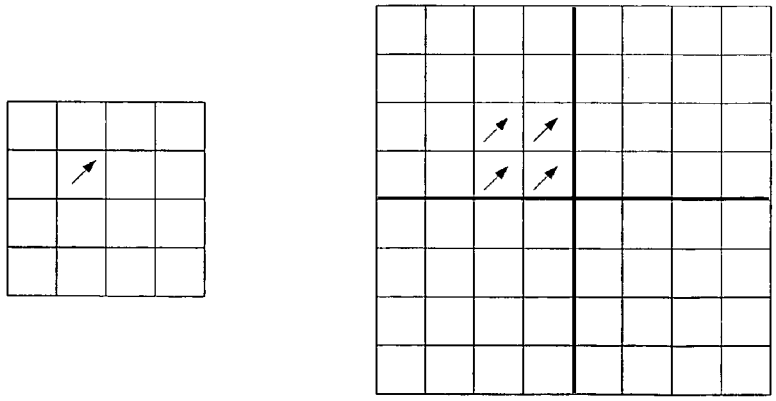
FIG. 3 intra prediction direction upsampling.

In FIG. 3 on the left is a macroblock of the BL. It corresponds to four macroblocks in the EL, which is shown on the right side of the figure. The bold line is the boundary of the four macroblocks. According to the invention, the intra-prediction direction in the BL is directly given to four co-located 4×4 blocks in the process of intra prediction direction upsampling. Thus, when one macroblock uses INTRA_DIRECT mode, the intra prediction direction needs not explicitly be encoded. Instead, it can be derived at the decoder side by just upsampling the BL prediction directions. As in intra4×4 mode, the intra prediction direction would take a considerable portion of the total bitrate. This new coding method reduces the side information and thus helps decreasing the bitrate.

After intra-prediction direction upsampling, the macroblock in the EL can be predicted in the same way as intra4×4, and then the residual is encoded.

In the special case when all blocks in the macroblock have the same intra-prediction direction, we can similarly use intra16×16 mode to do intra-prediction, followed by residual coding. Because in intra16×16, the DC coefficients of sixteen 4×4 blocks are transformed and coded in order to improve coding efficiency, this approach can reduce the bits in this case.

In the above discussion we only deal with the luminance component. For chroma components, the whole macroblock is predicted by neighbour reconstructed pixels. Therefore in INTRA_DIRECT mode, the intra-prediction direction upsampling is done by setting the chroma intra-prediction direction the same as the block in BL.

When using INTRA_DIRECT mode, the coded block pattern (CBP) can also be coded with new context-adaptive binary arithmetic coding (CABAC) context. The idea is that when one block in the BL is also zero after quantization, then also the corresponding four 4×4 blocks in the EL tend to be zero. Therefore this correlation can also be taken into account when designing CABAC context for enhancement-layer CBP.

Advantageously, the proposed approach is of low complexity. For spatial scalable applications, the encoder may want to maintain very low complexity. Directly reusing the BL intra-prediction direction is very advantageous for such cases. No intra-prediction direction search is performed. Also when this mode is used together with other modes, the increased complexity is very low. For the decoder, the scheme is also very efficient and does not increase complexity.

TABLE 1

| | INTRA_DIRECT mode within the JVT reference software | | |
|---|---|---|---|
| 1 | macroblock_layer_in_scalable_extension( ) { | C | Descriptor |
| 2 | if( base_id_plus1 != 0 && adaptive_prediction_flag) { | | |
| 3 | base_mode_flag | 2 | ae(v) |
| 4 | if( base_mode_flag && HalfSpatResBaseFlag && intra_base_mb(CurrMbAddr) | | |
| 5 | intra_direct_flag | 1 | ae(v) |
| 6 | if( ! base_mode_flag && HalfSpatResBaseFlag && ! intra_base_mb( CurrMbAddr ) ) | | |
| 7 | base_mode_refinement_flag | 2 | ae(v) |
| 8 | } | | |
| 9 | if( ! base_mode_flag && ! base_mode_refinement_flag ) { | | |
| 10 | mb_type | 2 | ae(v) |
| 11 | if( mb_type = = I_NxN && base_id_plus1 != 0 ) | | |
| 12 | intra_base_flag | 2 | ae(v) |
| 13 | } | | |

TABLE 1-continued

INTRA_DIRECT mode within the JVT reference software

| 1 | macroblock_layer_in_scalable_extension( ) { | C | Descriptor |
|---|---|---|---|
| 14 | if( mb_type = = I_PCM ) { | | |
| 15 | while( !byte_aligned( ) ) | | |
| 16 | pcm_alignment_zero_bit | 2 | f(1) |
| 17 | for( i = 0; i < 256; i++ ) | | |
| 18 | pcm_sample_luma[ i ] | 2 | u(v) |
| 19 | for( i = 0; i < 2 * MbWidthC * MbHeightC; i++ ) | | |
| 20 | pcm_sample_chroma[ i ] | 2 | u(v) |
| 21 | } else { | | |
| 22 | NoSubMbPartSizeLessThan8x8Flag = 1 | | |
| 23 | if( mb_type != I_NxN && MbPartPredMode( mb_type, 0 ) != Intra_16x16 && NumMbPart( mb_type ) = = 4 ) { | | |
| 24 | sub_mb_pred_in_scalable_extension( mb_type ) | 2 | |
| 25 | for( mbPartIdx = 0; mbPartIdx < 4; mbPartIdx++) | | |
| 26 | if( sub_mb_type[ mbPartIdx ] != B_Direct_8x8 ) { | | |
| 27 | if( NumSubMbPart( sub_mb_type [ mbPartIdx ] ) > 1 ) | | |
| 28 | NoSubMbPartSizeLessThan8x8Flag = 0 | | |
| 29 | } else if( !direct_8x8_inference_flag ) | | |
| 30 | NoSubMbPartSizeLessThan8x8Flag = 0 | | |
| 31 | } else { | | |
| 32 | if( transform_8x8_mode_flag && mb_type = = I_NxN ) | | |
| 33 | transform_size_8x8_flag | 2 | ae(v) |
| 34 | mb_pred_in_scalable_extension( mb_type ) | 2 | |
| 35 | } | | |
| 36 | if( MbPartPredMode( mb_type, 0) != Intra_16x16 ) { | | |
| 37 | coded_block_pattern | 2 | ae(v) |
| 38 | if( CodedBlockPatternLuma > 0 && transform_8x8_mode_flag && mb_type != I_NxN && NoSubMbPartSizeLessThan8x8Flag && !( MbPartPredMode( mb_type, 0 ) = = B_Direct_16x16 && !direct_8x8_inference_flag ) ) | | |
| 39 | transform_size_8x8_flag | 2 | ae(v) |
| 40 | } | | |
| 41 | if( CodedBlockPatternLuma > 0 \|\| CodedBlockPatternChroma > 0 \|\| MbPartPredMode( mb_type, 0) = = Intra_16x16 ) { | | |
| 42 | mb_qp_delta | 2 | ae(v) |
| 43 | residual_in_scalable_extension( ) | 3\|4 | |
| 44 | } | | |
| 45 | } | | |
| 46 | } | | |

Tab. 1 gives an example of adding the new INTRA_DIRECT mode to the JVT reference software JSVM. A new flag is added, and related syntax is modified. The basic syntax is from H.264, and lines 2, 3 and 6-13 are added by JSVM. Further, lines 24, 34 and 43 were modified by JSVM for scalable extension. Lines 4 and 5 are added by the current invention.

Figure 4:
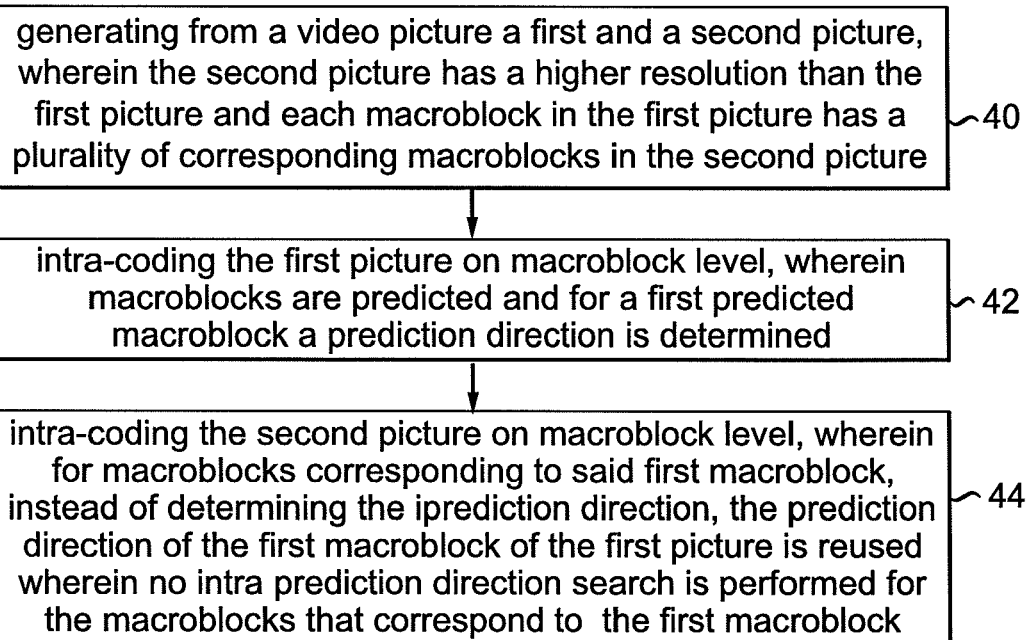
FIG. 4 is a flow chart showing the steps for encoding video pictures.
Figure 5:
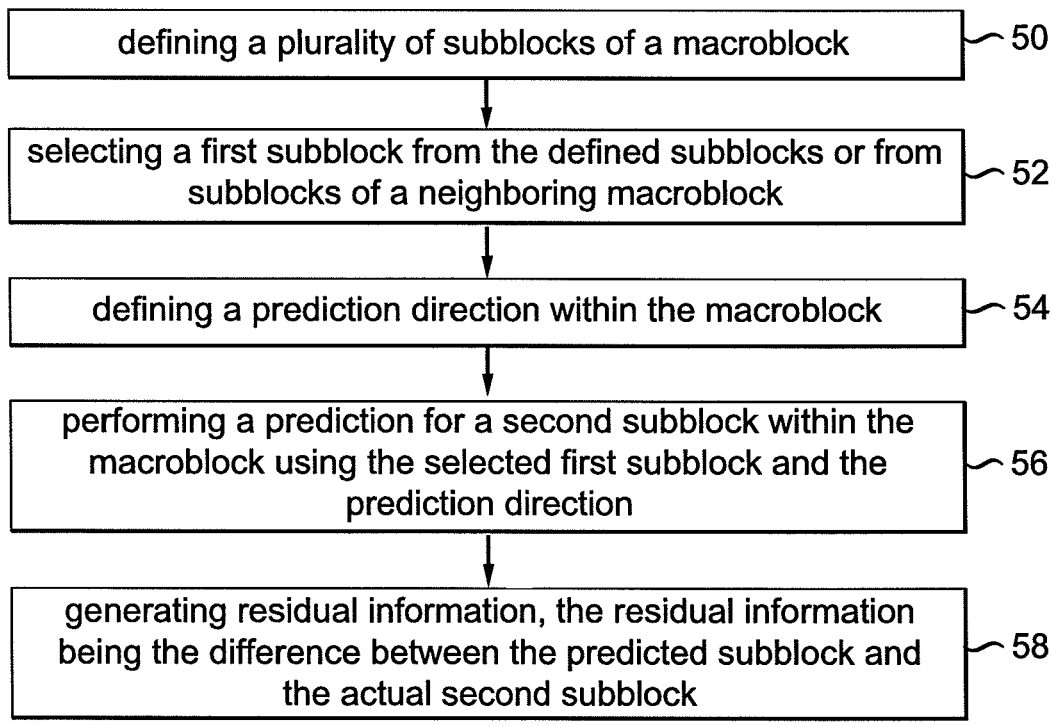
FIG. 5 is a flow chart showing the steps for intra-coding of a picture in a macroblock level.

FIG. 4 is a flow chart showing the method for encoding video pictures using an encoder. A first and a second picture are generated from a video picture in step 40. The second picture has a higher resolution than the first picture and each macroblock in the first picture has a plurality of corresponding macroblocks in the second picture. The first picture is intra-coded on macroblock level in step 42. Macroblocks are intra predicted and for a first. The second picture is intra-coded on macroblock level in step 44. Macroblocks corresponding to said first macroblock, instead of determining the intra prediction direction. The intra prediction direction of the first macroblock of the first picture is reused. No intra prediction direction search is performed for the macroblocks that correspond to said first macroblock FIG. 5 is a flow chart showing intra-coding of a picture on macroblock level. A plurality of subblocks of a macroblock are defined. A first subblock is selected from the defined subblocks or from subblocks of a neighboring macroblock. A prediction direction within the macroblock is defined. A prediction for a second subblock within the macroblock is performed using the selected first subblock and the prediction direction. Residual information is generated, the residual information being the difference between the predicted subblock and the actual second subblock.

Figure 6:
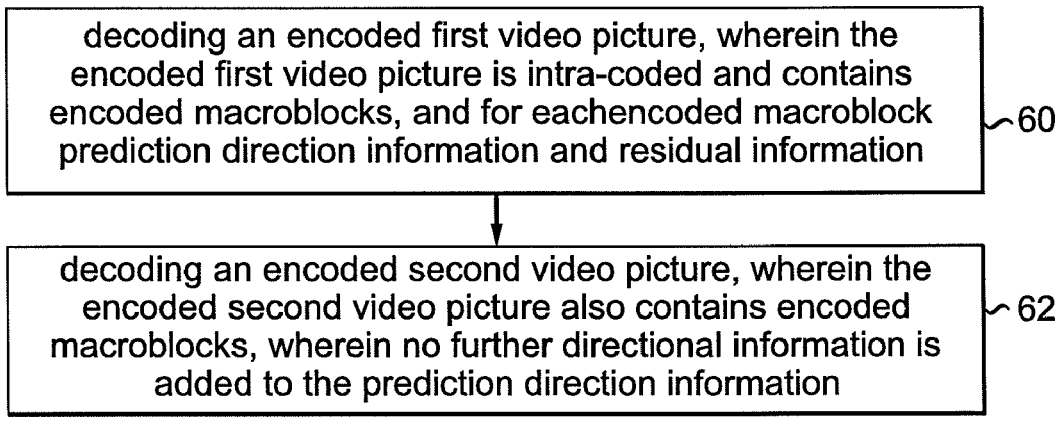
FIG. 6 is a flow chart showing the steps for decoding video pictures.

FIG. 6 is a flow chart showing a method for decoding video pictures. An encoded first video picture is decoded. The encoded first video picture is intra-coded and contains encoded macroblocks, and for each encoded macroblock prediction direction information and residual information. An encoded second video picture is decoded. The encoded second video picture also contains encoded macroblocks.

Figure 7:
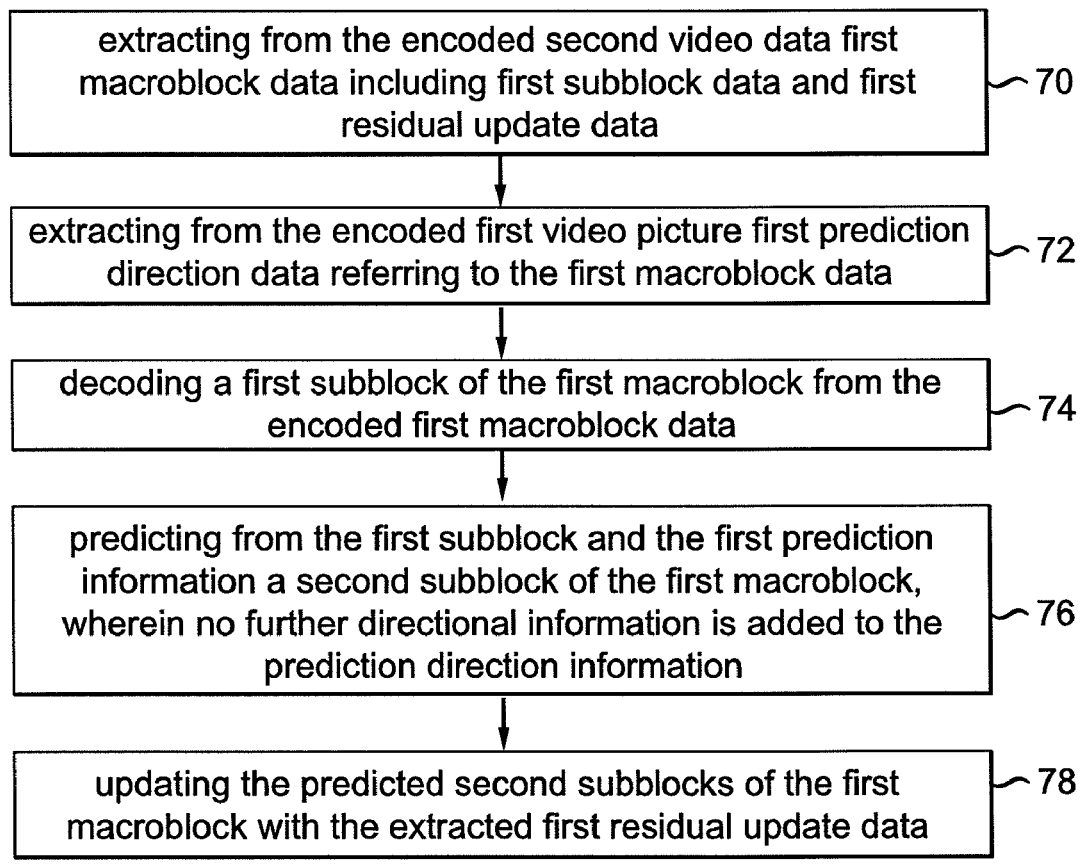
FIG. 7 is a flow chart showing the steps for decoding of the encoded second video picture.

FIG. 7 is a flow chart showing the decoding of the encoded second video picture. First macroblock data including first subblock data and first residual update data is extracted from the encoded second video data. First prediction direction data referring to the first macroblock data is extracted from the encoded second video data. A first subblock of the first macroblock is decoded from the encoded first macroblock data. A second subblock of the first macroblock is predicted from the first subblock and the first prediction information, wherein no further directional information is added to the prediction direction information. The predicted second subblocks of the first macroblock with the extracted first residual update data is updated.

The disclosed scheme of intra direct coding has two obvious advantages: First it will decrease the bitrate of intra-coded EL, and second the complexity is very low. For some sequences however the gain is not as good as for others.

Basically, the invention is particularly designed for the intra coding of spatial scalable video coding.

In this document an enhancement technique for improving the coding efficiency of intra pictures in the scenario of spatial scalable video coding is disclosed, which is named intra direct. As intra prediction is an efficient tool to improve the coding efficiency of intra pictures, scalable video coding may also utilize intra prediction for intra picture coding. The proposed method exploits the correlation of intra prediction direction between the BL and the EL. According to the new coding method, the EL inherits the intra prediction direction from the BL, and thus needs not to encode the intra-prediction mode data. When incorporating the proposed coding method within scalable video codecs, their coding efficiency is improved.

The present scheme can decrease the total bitrate of the EL of intra-coded pictures, thus improving the coding efficiency. The method is of very low complexity and can be used in a wide range of low-complexity application scenarios.

In principle, the encoding and the decoding methods are also usable for other data than video data, e.g. audio data, if they are appropriately encoded.

The invention claimed is:

1. Method for encoding video pictures using an encoder, the method comprising the steps of
   generating from a video picture a first and a second picture, wherein the second picture has a higher resolution than the first picture and each macroblock in the first picture has a plurality of corresponding macroblocks in the second picture;
   intra-coding the first picture on macroblock level, wherein macroblocks are intra predicted and for a first intra predicted macroblock an intra prediction direction is determined; and
   intra-coding the second picture on macroblock level, wherein for macroblocks corresponding to said first macroblock, instead of determining the intra prediction direction, the intra prediction direction of the first macroblock of the first picture is reused, wherein no intra prediction direction search is performed for the macroblocks that correspond to said first macroblock, and wherein intra-coding of a picture on macroblock level comprises the steps of
   defining a plurality of subblocks of a macroblock;
   selecting a first subblock from the defined subblocks or from subblocks of a neighboring macroblock;
   defining a prediction direction within the macroblock;
   performing a prediction for a second subblock within the macroblock using the selected first subblock and the prediction direction; and
   generating residual information, the residual information being the difference between the predicted subblock and the actual second subblock.

2. Method according to claim 1, wherein the intra prediction direction is scaled according to the resolution difference between the first and the second picture.

3. Method according to claim 1, further comprising the steps of
   generating a first residual picture being the difference between the first picture and the intra-coded first picture; and
   generating a second residual picture being the difference between the second picture and the intra-coded second picture.

4. Method for decoding video pictures, the method comprising the steps of
   decoding an encoded first video picture, wherein the encoded first video picture is intra-coded and contains encoded macroblocks, and for each encoded macroblock prediction direction information and residual information;
   decoding an encoded second video picture, wherein the encoded second video picture also contains encoded macroblocks, and wherein the decoding of the encoded second video picture comprises steps of
   extracting from the encoded second video data first macroblock data including first subblock data and first residual update data;
   extracting from the encoded first video picture first prediction direction data referring to the first macroblock data;
   decoding a first subblock of the first macroblock from the encoded first macroblock data;
   predicting from the first subblock and the first prediction information a second subblock of the first macroblock, wherein no further directional information is added to the prediction direction information; and
   updating the predicted second subblocks of the first macroblock with the extracted first residual update data.

5. Method according to claim 4, wherein the intra prediction direction information is scaled according to the resolution difference between the first and the second picture.

* * * * *